March 15, 1966  C. KRASTCHEW  3,240,967
COOLING ARRANGEMENT FOR ELECTRIC MACHINES
Filed July 31, 1959
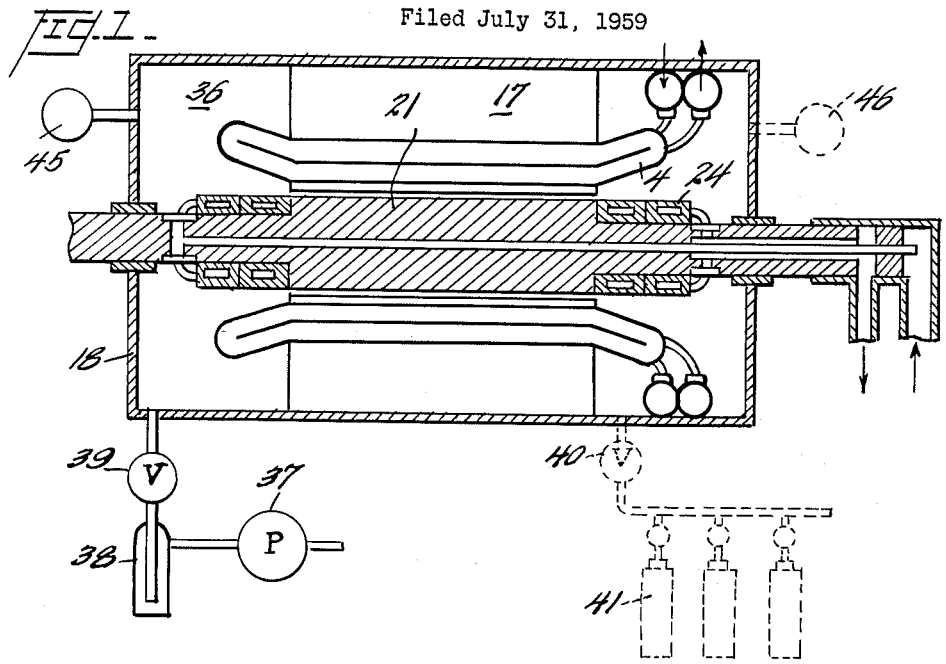
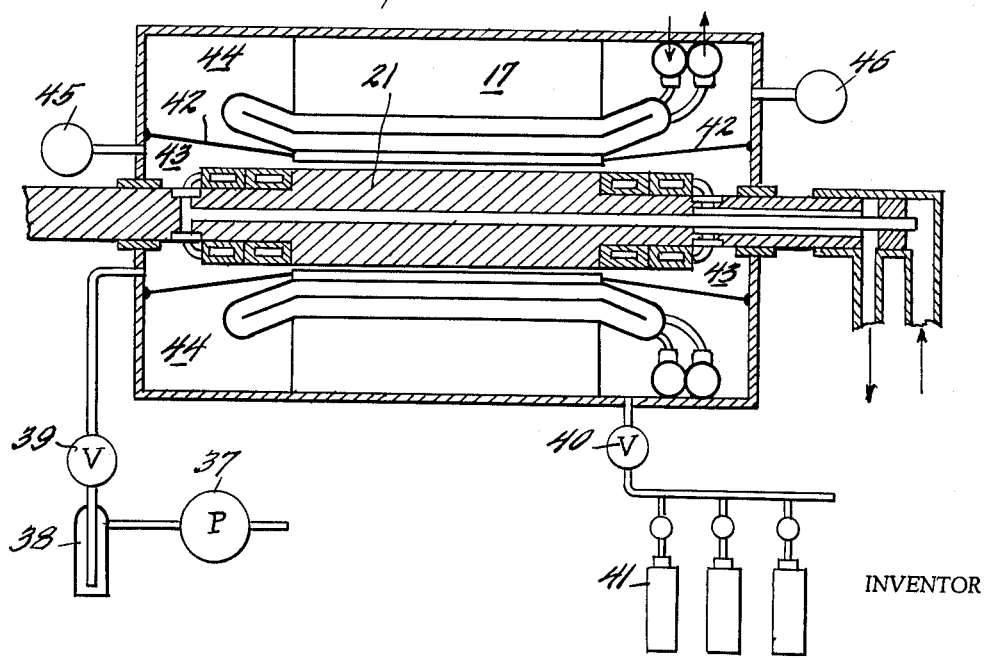
INVENTOR
Christoslaw Krastchew,
BY Watson, Cole, Grindle & Watson
ATTORNEYS

United States Patent Office 3,240,967
Patented Mar. 15, 1966

3,240,967
COOLING ARRANGEMENT FOR
ELECTRIC MACHINES
Christoslaw Krastchew, Rua Fortunato 238, Ap. 33,
Sao Paulo, Brazil
Filed July 31, 1959, Ser. No. 830,786
4 Claims. (Cl. 310—54)

The present invention relates to electric machines.

More particularly, the present invention relates to electric machines such as generators, for example, which have stators and rotors and in which there is a particular problem involved in cooling of the machine and keeping the windage losses at a minimum.

This application is a continuation-in-part of copending application Serial No. 451,625, filed August 23, 1954, and entitled Refrigeration Cooling of Electrical Machines.

In machines as disclosed in the above application the rotor and stator windings of a machine such as a relatively large generator are internally cooled by a fluid flowing therethrough.

At the present time hydrogen is used in machines of the above type for two main reasons, namely, for reducing windage and ventilating losses so that they are about one tenth the value of such losses where air is used, and for providing better cooling so that the output of the machine can be increased by 20%. Hydrogen also presents the advantages of reducing oxidation of the insulation, reducing windage noise, etc.

It is known that in order to take full advantage of cooling with relatively high hydrogen pressure generators may be constructed with internally gas cooled windings used in gas pressure of up to 90 lbs. per sq. inch. The increased hydrogen pressure in internally gas cooled generators diminish the fan loss but, on the other hand, increase the windage loss of the supercharged machine and thus the efficiency is sacrificed. Recent developments in internally cooled generators have increased the efficiency thereof but there are still possibilities of realizing even higher efficiencies.

The primary object of the present invention is to provide a means for increasing the generator efficiency by greatly reducing the windage loss.

Another object of the present invention is to reduce the windage loss without using hydrogen as a windage loss reducing agent or as a cooling agent.

It is also an object of the present invention to provide for a reduction of the windage loss without complications such as expensive fire and explosion control equipment, as are conventionally required where hydrogen is used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional schematic illustration of one embodiment of an electrical machine which incorporates the structure of the invention; and FIG. 2 is a sectional diagrammatic illustration of another embodiment of an electrical machine which incorporates the structure of the invention.

The drawings show on a reduced scale large turbine generators provided with internally liquid-cooled rotor and stator windings as well as internally liquid-cooled stator and rotor cores.

Referring to FIG. 1, the liquid-cooled generator illustrated therein is housed within an enclosure means 18 in the form of a housing which is sealed fluid-tightly from the outer atmosphere. The stator core 17 together with the internally liquid-cooled stator windings 4 are mounted on the enclosure means 18 within the interior thereof. The cooling of the coil 4 takes place according to the teachings of the above-referred to patent application. Thus, the cooling fluid is supplied to a header 50 from which the cooling fluid flows along the interior of the coil 4, and the heated cooling fluid discharges into the header 51 from which the fluid flows through a suitable heat exchanger to be cooled and to then be again recirculated through the stator, the fluid being moved by a suitable pump, all as disclosed in the above-identified application.

The liquid-cooled rotor core 21 with the liquid-cooled rotor windings 24 rotate in the interior space 36 of the enclosure means 18. The cooling of the rotor also takes place in the manner shown in the above-identified application. Thus, the cooling fluid enters through the inlet 52, flows along the interior of the tube 53 and along the axial bore of the rotor 21 to the chamber 54 from where the cooling fluid flows along the several conduits 55 through the hollow interiors 56 of the windings 24, the heated cooling fluid issuing through the conduits 57 into the chamber 58 from where fluid discharges through the outlet 59 to flow through a suitable exchanger and then to be again recirculated, a suitable pump also providing the circulation in this case.

In accordance with the present invention the interior 36 of the enclosure means 18 is evacuated so that the pressure in the interior space 36 is at substantially less than atmospheric pressure, and this evacuation is brought about by means of a vacuum pump 37 which communicates through a trap 38 and a valve 39 with the interior 36 of the enclosure means 18. With this structure it is possible to reduce the pressure in the interior 36 of the enclosure means 18 to a predetermined degree of vacuum which can be read on the meter 45, and by maintaining the generator components in such a vacuum a low windage and ventilating loss of the rotating rotor 21 is assured. By providing different degrees of vacuum in the space 36 it is possible to obtain different degrees of windage loss and to set the windage loss as desired.

Depending upon leakage, pump speed, etc., it is possible to achieve with this structure much smaller windage losses for a given machine than if the same machine were cooled by hydrogen under higher pressure or if it were operated at a normal gas pressure of 0.5 lb. per sq. inch.

In contrast to generators having internally gas-cooled windings operating under higher hydrogen pressure and having expensive compressors (fans) with comparatively high pumping and windage losses, the above-described construction requires only the relatively inexpensive equipment for producing the desired degree of vacuum, with extremely low windage and liquid-pumping losses. These windage and liquid-pumping losses are of practically no economic significance for the type of electric generator illustrated. As a result, the generators of the invention will have less total losses and higher efficiency than conventional types of generators.

In certain special cases it may be desired to fill the evacuated interior 36 of the enclosure means 18 with a special fire-preventing and windage loss-reducing gas (He). This can be done by supplying such a gas to the evacuated interior 36 through a valve 40 shown in dotted lines in FIG. 1, this valve being opened enough to permit relatively small quantities of the windage loss and fire-reducing gas stored in the gas containers 41 to enter into the previously evacuated space 36. Thus, after a predetermined degree of vacuum indicated by the gauge 45 is obtained by operation of the pump 37, the valve 39 is maintained closed, and then the valve 40 is opened so as to introduce the special gas into the interior 36 of the enclosure means 18, and the pressure of this latter gas may be seen either on the gauge 45 or on a special gauge 46 provided for this purpose, as shown in dotted lines in FIG. 1.

Only small quantities of the windage loss and fire-preventing gas will be required, and no gas-ventilating or gas-circulating facilities will be required, as in the case of hydrogen-cooled generators. Also, with the structure of the invention no means is required for cooling, transporting, and guiding large quantities of gas of the hydrogen cooled generators as is now conventional. Thus, the machine diameter of the structure of the invention will be smaller than for comparable conventional machines.

According to the embodiment of the invention which is illustrated in FIG. 2, the inner tubular portion of the stator 17 which directly surrounds the rotor 21 forms part of the evacuated enclosure means. The evacuated enclosure means of this embodiment also includes the fluid-tight tubular sections 42 which are fixed at their ends which are nearest to each other respectively to the ends of the inner tubular portion of the stator 17 and which are fixed at their outer ends to the adjoining wall portions of the housing in which the stator 17 is located, as shown in FIG. 2. These adjoining wall portions fluid-tightly surround the rotor, so that the latter wall portions together with the tubular sections 42 and the inner tubular portion of the stator 17 form an enclosure means whose interior space 43 can be evacuated by the vacuum pump 37 acting through the trap 38 and the valve 39 in the manner described above in connection with FIG. 1. The housing of the structure of FIG. 2 includes end plates which are removable and which are easily connectable to the tubular section 42 to enable the structure of FIG. 2 to be easily assembled and disassembled where necessary. Thus, the inner space 43 of the evacuated enclosure means is separated from the space 44 of the housing which surrounds this enclosure means. By reducing the pressure within the space 43 to a value substantially less than atmospheric pressure the desired degree of vacuum which is indicated on the gauge 45 is obtained, and thus the windage losses of the rotor 21 is maintained very low, in accordance with the present invention.

The space 44 in which the stator 17 is located may also be sealed off from the outer atmosphere, and this space may simply be at normal atmospheric pressure. However, for some special reason, such as for reduction of the corona effect, the space 44 may be filled with any corona reducing liquid (transformer oil) or gas under pressure (such as $CO_2$). Such a gas under pressure is supplied to the space 44 through the conduit which is provided with the valve 40, this gas being derived from the gas containers 41 shown in FIG. 2, and of course the pressure of the fluid within the space 44 is visible at the gauge 46.

As was the case with the embodiment of FIG. 1, if desired or necessary, the space 43, after it is suitably evacuated, may be filled with relatively small quantities of any windage loss reducing and fire-preventing gas (He). Only small quantities of such a gas are required with the structure of the invention, and furthermore no gas ventilating, cooling, circulating and guiding facilities are required, while, in contrast, such facilities are essential with hydrogen-cooled generators.

It will be understood that each of the elements described above, or two or more together, may also find a useful application in other types of electrical machines differing from the types described above.

While the invention has been illustrated and described as embodied in electric machines having a windage loss reducing structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A dynamoelectric machine comprising internally liquid cooled rotor and stator windings and cores, the internally liquid cooled rotor and stator being coaxial with each other and defining therebetween an air gap, and being enclosed in a machine housing, said machine housing being vacuum-tightly built and sealed off from the outer atmosphere; and pumping means communicating with the interior of said machine housing and operating during the operation of said machine for evacuating the air and vapors and for maintaining in the interior of said machine housing a static air pressure substantially less than atmospheric pressure for reducing the windage losses of the internally liquid cooled rotor of said dynamoelectric machine, and for removing vapors resulting from leakage of liquid from said liquid-cooled rotor and stator windings and cores.

2. A dynamoelectric machine comprising internally liquid cooled rotor and stator windings and cores, the internally liquid cooled rotor and stator being coaxial with each other and defining therebetween an air gap and being enclosed in a machine housing, said machine housing being vacuum-tightly built and sealed off from the outer atmosphere; and pumping means communicating with the interior of said machine housing for evacuating the air and vapors and for maintaining in the interior of said machine housing during the operation of said machine, a static air pressure substantially less than atmospheric pressure for reducing the windage losses of the internally liquid cooled rotor of said dynamoelectric machine; further means communicating with the interior of said machine housing for supplying to and maintaining in the evacuated machine an uncooled non-explosive corona depressing gas in static condition.

3. A dynamoelectric machine comprising internally liquid cooled rotor and stator windings and cores, said stator having an inner tubular portion surrounding a rotor and being coaxial therewith, and defining therewith an air gap; a fluid-tight machine housing in which the internally liquid cooled rotor and stator are located, the machine space inside the machine housing being divided into rotor and stator spaces by means of tubular sections respectively extending from said inner tubular portion of said stator to wall portions of said machine housing which surround the said rotor; said machine housing wall portions, tubular sections and inner tubular portion of said stator forming a rotor space enclosure sealed vacuum-tightly from the surrounding stator space and the outer atmosphere and in which the rotor is located; and pumping means communicating with the interior of said rotor space and operating during the operation of said machine for evacuating of the air and vapors and maintaining in the interior of the said rotor space a static air pressure substantially less than atmospheric pressure for reducing the windage losses of the internally liquid cooled rotor of said dynamoelectric machine and for removing vapors resulting from leakage of liquid from said liquid-cooled rotor and stator windings and cores; the said stator space being of at least atmospheric pressure.

4. A dynamoelectric machine as defined in claim 3 in which said stator space is filled with a substance having a high corona depressing strength and the rotor is filled with gas vapors of high dielectric strength.

(References on following page)

References Cited by the Examiner

UNITED STATES PATENTS

| | | | | |
|---|---|---|---|---|
| Re. 16,126 | 7/1925 | Schuler | 310— | 55 |
| 1,145,612 | 7/1915 | Porter | 310— | 54 |
| 1,448,700 | 3/1923 | Seidner | 310— | 54 |
| 1,657,550 | 1/1928 | Saathoff | 310— | 54 X |
| 1,696,612 | 12/1928 | Rice | 310— | 53 |
| 2,173,717 | 9/1939 | Hobart | 310— | 55 |
| 2,233,194 | 2/1941 | Atlee et al. | | |
| 2,307,755 | 1/1943 | Beckwith | 310— | 55 |
| 2,618,756 | 11/1952 | Fechheimer | 310— | 54 |
| 2,722,616 | 11/1955 | Moses | 310— | 54 |
| 2,970,232 | 1/1961 | Kilbourne | 310— | 64 |

FOREIGN PATENTS 896,086   11/1953   Germany.

ORIS L. RADER, *Primary Examiner.*

DAVID X. SLINEY, MILTON O. HIRSHFIELD,
*Examiners.*